Sept. 8, 1931.  F. C. LAMB  1,822,491
SAFETY BRAKE FOR AUTOMOBILES
Filed March 28, 1929
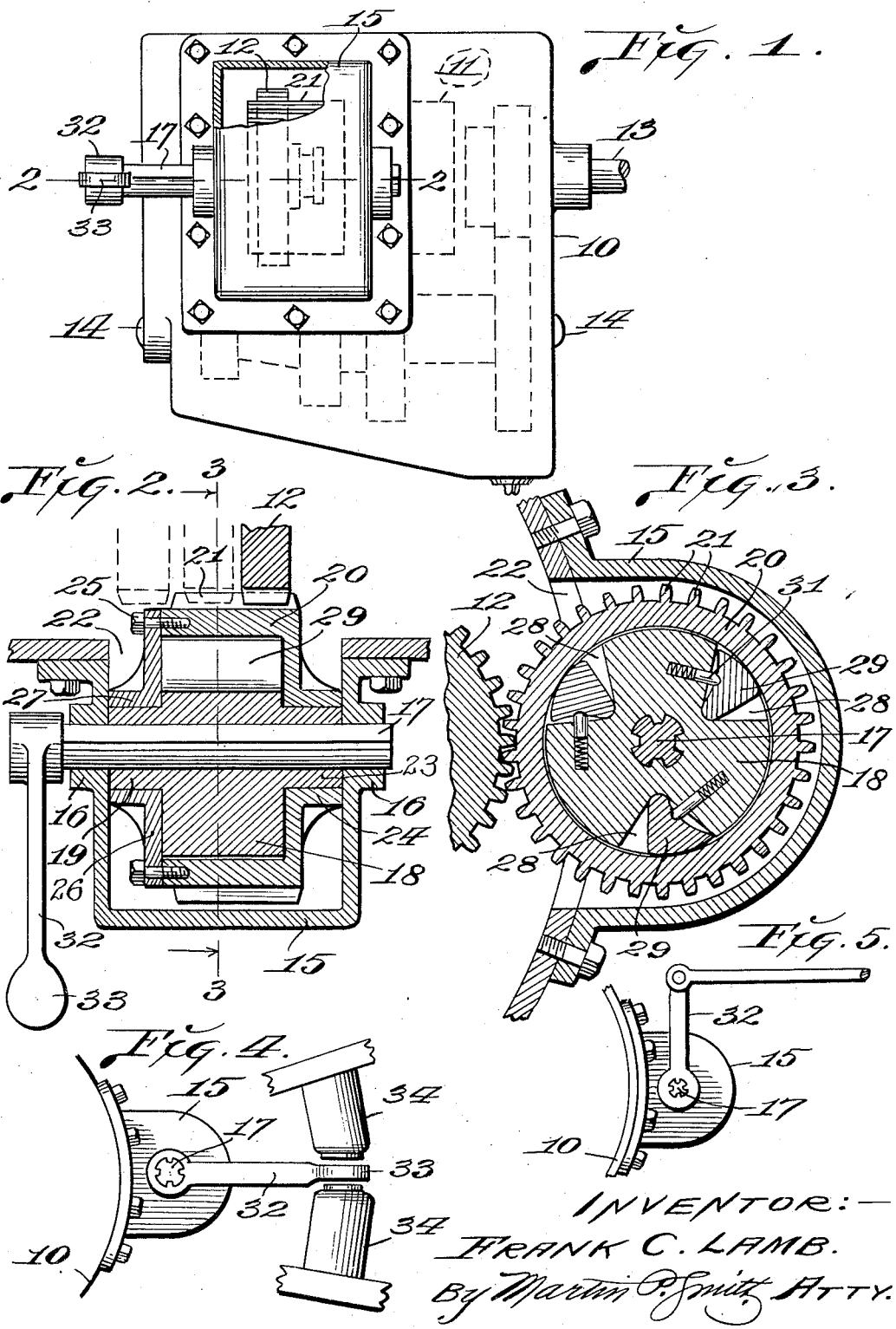
INVENTOR:—
FRANK C. LAMB.
By Martin P. Smith, Atty.

Patented Sept. 8, 1931

1,822,491

UNITED STATES PATENT OFFICE

FRANK C. LAMB, OF LOS ANGELES, CALIFORNIA

SAFETY BRAKE FOR AUTOMOBILES

Application filed March 28, 1929. Serial No. 350,462.

My invention relates to a safety brake for automobiles and the principal object of my invention is to provide a safety device in the nature of an automatically acting clutch that is associated with the transmission gearing of the automobile and which will be effective in preventing the automobile from backing up or starting to move rearwardly when the vehicle has been stopped while on an incline or grade or while the operation of shifting gears is accomplished while the vehicle is ascending a grade.

Further objects of my invention are to provide a safety brake for automobiles that is relatively simple in construction, inexpensive of manufacture and which may be conveniently associated with practically all vehicles that are equipped with the standard and generally used forms of transmission gear.

Further objects of my invention are to provide a safety device of the character referred to that is wholly automatic in action and which will permit the vehicle to be backed or moved rearwardly when the reverse gearing is engaged or in mesh.

The construction herein illustrated and described is an improvement upon the motor vehicle brake forming the subject matter of a copending application for U. S. Letters Patent filed by me June 2nd, 1924, Serial No. 717,276.

With the foregoing and other objects in view, my invention consists in certain novel features of construction and arrangement of parts that will hereinafter be more fully described and claimed and illustrated in the accompanying drawings, in which:

Fig. 1 is a side elevational view of the transmission gear housing of an automobile and showing my improved safety brake device associated therewith.

Fig. 2 is a horizontal section taken on the line 2—2 of Fig. 1.

Fig. 3 is a cross section taken on the line 3—3 of Fig. 2.

Fig. 4 is an end elevational view of the safety device and showing the lever arm thereof positioned between a pair of yielding resistance members or bumpers.

Fig. 5 is an end elevational view of the safety device and showing the lever arm thereof connected to the emergency brake of the vehicle.

Referring by numerals to the accompanying drawings, which illustrate a practical embodiment of my invention, 10 designates a housing that encloses the standard form transmission gearing of an automobile and which transmission gearing includes a high and intermediate sliding gear 11 and a low and reverse sliding gear 12, both of these gears being splined on the main shaft of the transmission, which latter is in axial alignment with the main driving shaft 13 and arranged in the lower portion of the housing, 10 is a cluster gear shaft 14 on which is located the usual counter gears that are engaged by the sliding gears 10 and 12.

Fixed in any suitable manner on the transmission gear housing 10 is a housing 15 and arranged on the side walls thereof are bearings 16 for a shaft 17.

Splined upon this shaft 17 is a disc or circular head 18 provided on its sides with hubs 19.

Enclosing the disc or head 18 is a shell or ring 20 provided on its periphery with gear teeth 21 and which latter are engaged by the teeth of the low and reverse sliding gear 12 of the transmission.

The width of ring 20, provided with the teeth 21, is such that said ring and gear are always enmeshed while gear 12 is in neutral position and while enmeshed with the low gear on counter shaft 14, but when gear 12 is shifted into engagement with the reverse gear then the teeth of said gear 12 are out of engagement with the teeth on ring 20.

In order that gear 12 may mix with the teeth 21 on the ring 20 an opening 22 is formed in the side wall of the transmission gear housing 10 and which opening is enclosed by the housing 15. Formed integral with one side of the ring 20 is a disc 23 and formed integral with said disc is a hub 24 that is mounted to rotate freely upon the corresponding hub 19 of the disc or head 18.

Removably secured to the opposite side face of ring 20, preferably by bolts 25, is a disc 26 provided with an integral hub 27 that rotates freely upon the corresponding hub 19.

Formed in the periphery of disc or head 18 and preferably spaced at equal distances apart are substantially U-shaped notches or recesses 28 within each of which is arranged a substantially triangular clutch block 29 having an eccentric outer face 30 that is adapted, when the clutch block is moved to an extreme position in one direction, to frictionally engage the inner periphery of the ring 20.

Bearing against one of the side faces of each clutch block 29 is a spring pressed pin 31 and which pin normally tends to force the clutch block into frictional engagement with the inner face of the ring 20.

The construction just described functions as an overrunning clutch which permits the toothed ring 20 and parts connected thereto, to rotate freely in one direction but in the event that said toothed ring starts to rotate in the opposite direction it will, through the action of the clutch blocks 29, be locked to the disc or head 18 so as to tend to rotate the latter in the same direction.

Fixed on one end of shaft 17 is an arm 32 and the outer end of this arm may be suitably connected to the emergency brake actuating mechanism of the automobile as illustrated in Fig. 5 or the outer end of said arm may be provided with a disc or plate such as 33 that is positioned between a pair of yielding resistance members 34 of rubber or springs as illustrated in Fig. 4.

While the vehicle with which my improved safety device is associated is being driven forwardly in the usual manner the law and reverse sliding gear 12 being splined on the main transmission shaft rotates constantly therewith at all speeds and as said gear 12 is in mesh with ring gear 20 the latter will be constantly rotated on the hubs 19 of the disc or head 18.

In the event that the vehicle is stopped while ascending a grade or if the gears are shifted while ascending a grade and the vehicle starts to roll backwardly, ring gear 20 will be instantly locked to the disc or head 18 through the spring pressed clutch blocks 29 and thus the ring gear and enclosed disc or block 18 will reversely rotate as one part and the disc or head 18 being splined upon shaft 17 will cause the latter to rotate and the swinging movement of arm 32 that is carried on shaft 17 be resisted by the bumpers 34, in the event that the latter are employed, or if said arm 32 is connected to the emergency brake of the vehicle, the latter will be set as the automatic safety device functions as just described.

When the vehicle moves forwardly as the automatic action of the safety device as just described, the ring gear 20 will be ridden forwardly by the gear 20 without imparting movement to the disc or head 18.

Thus it will be seen that I have provided a safety brake device for automobiles that may be conveniently associated with the transmission gear of the vehicle and which safety device is wholly automatic in action and which is effective in preventing the vehicle from rolling backward while the gears are being shifted as the vehicle ascends an incline or grade or, if for any reason, the vehicle is stopped while ascending a grade.

I claim as my invention:

1. The combination with an automobile transmission gearing and its low and reverse sliding gear, a loosely mounted ring gear, the width of which is such that its teeth are in engagement with the low and reverse gear while the same is in neutral position and while enmeshed with the low gear on the counter gear shaft of the transmission, a disc within the ring gear, overrunning clutch members between the ring gear and disc, a shaft on which said disc is mounted, an arm secured to one end of said shaft and yielding pressure means arranged on opposite sides of the free end of said arm.

2. The combination with an automobile transmission gearing and its low and reverse sliding gear, of a housing mounted on the side of the transmission gear case, a ring gear mounted in said housing and constantly enmeshed with the low and reverse sliding gear while the same is in neutral position and while enmeshed with the low gear on the counter shaft of the transmission, a member arranged within said ring gear, overrunning clutch members arranged between said member and the ring gear for locking the same to each other upon reverse rotary movement of the ring gear an arm carried by said member and arranged on the exterior of the ring gear housing and means arranged on opposite sides of the free end of said arm for yieldingly resisting the movement of said arm in both directions.

3. The combination with an automobile transmission gearing and its low and reverse sliding gear, of a housing mounted on the side of the transmission gear case, a ring gear mounted in said housing and constantly enmeshed with the low and reverse sliding gear while the same is in neutral position and while enmeshed with the low gear on the counter shaft of the transmission, a member arranged within said ring gear, overrunning clutch members arranged between said member and the ring gear for locking the same to each other upon reverse rotary movement of the ring gear, an arm carried by said member and arranged on the exterior of the ring gear housing and means for yieldingly resisting and stopping the movement of said arm.

4. A safety brake device for automobiles, comprising a ring gear that is adapted to engage the low and reverse sliding gear of the automobile transmission gearing while said low and reverse sliding gear is in neutral position and while enmeshed with the low gear on the counter shaft of the transmission, a member associated with said ring gear and held for limited rotary movement, overrunning clutch members interposed between said ring gear and said member, a housing enclosing said ring gear and member, an arm rigidly fixed to said member and fixed cushioning means for resisting and limiting the swinging movement of said arm in both directions.

In testimony whereof I affix my signature.
FRANK C. LAMB.